United States Patent [19]
Kontants

[11] Patent Number: 5,776,564
[45] Date of Patent: Jul. 7, 1998

[54] SINGLE-PIN OR MULTI-PIN PLUG CONNECTOR WITH AN EXTRUDED HOUSING

[75] Inventor: Horst Kontants, Oldenburg, Germany

[73] Assignee: Siemens Aktiengesellschaft, Müchen, Germany

[21] Appl. No.: 569,141

[22] PCT Filed: Jun. 10, 1994

[86] PCT No.: PCT/DE94/00684

§ 371 Date: Mar. 4, 1996

§ 102(e) Date: Mar. 4, 1996

[87] PCT Pub. No.: WO95/00987

PCT Pub. Date: Jan. 5, 1995

[30] Foreign Application Priority Data

Jun. 23, 1993 [DE] Germany ............... 9309574 U

[51] Int. Cl.$^6$ ................................. F16D 65/52
[52] U.S. Cl. .................. 428/34.1; 188/1.11; 340/454
[58] Field of Search ............ 428/34.1; 188/1.11; 340/454

[56] References Cited

U.S. PATENT DOCUMENTS

| | | |
|---|---|---|
| 3,905,668 | 9/1975 | Gee ........................ 339/60 M |
| 5,207,299 | 5/1993 | Feldmann ................. 188/79.55 |
| 5,513,726 | 5/1996 | Thompson et al. ........ 188/1.11 |

FOREIGN PATENT DOCUMENTS

| | | |
|---|---|---|
| 0 348 040 | 12/1989 | European Pat. Off. . |
| 0 508 629 | 10/1992 | European Pat. Off. . |
| 25 35 265 | 2/1977 | Germany . |
| 29 26 918 | 1/1981 | Germany . |
| 33 24 865 | 5/1984 | Germany . |
| 38 12 178 | 6/1989 | Germany . |

OTHER PUBLICATIONS

Prospectus of PM Fahrzeugteile—Car Parts, 1987 2 pp.

*Primary Examiner*—Charles Nold
*Attorney, Agent, or Firm*—Kenyon & Kenyon

[57] ABSTRACT

To insert insulated conductors or cables jacketed with an insulation or a sheath of a fluorinated ethylene polymer imperviously into a housing of thermoplastic material produced by means of extrusion, the conductor insulation or the sheath is provided with an external coating of a thermoplastic material.

15 Claims, 1 Drawing Sheet

SINGLE-PIN OR MULTI-PIN PLUG CONNECTOR WITH AN EXTRUDED HOUSING

BACKGROUND OF THE INVENTION

The present invention relates generally to the structural design of plug connectors, and more particularly to the structural design of a single-pin or multi-pin plug connector, whose housing envelopes the contact elements and the insulated electric conductors attached thereto. Plug connectors of this sort are used, for example, for indicators used to monitor the thickness of brake linings in motor vehicles. Usually, these plug connectors are located at one end of a single-core or multi-core cable, at whose other end the actual wear sensor is arranged. In manufacturing such an indicator, one end of the conductor or conductors is first equipped with the sensor element, and the other end of the conductor or conductors is provided with contact elements. A plastic housing is then extruded on around the sensor element; a plug-connector housing, generally made of a thermoplastic material, is extruded on in the same way at the end provided with the contact elements For example, see German Laid Open Print 25 35 265 B1, and German Provisional Patent 39 04 673 A1.

To allow for the temperatures that occur in the proximity of the brake when working with monitoring devices of this type, a high-temperature-resistant plastic, such as polytetrafluoroethylene (PTFE), is generally used as insulation for the electric conductors (See, e.g., German 33 24 865 C1). However, the polar properties of this plastic and of similar fluorinated ethylene polymers make it difficult to imperviously anchor the plug-connector-side housing to the conductor insulation.

The present invention is therefore directed to the problem of developing a single-pin or multi-pin plug connector that can be used in high temperature applications, and has the plug-connector-side housing imperviously anchored to the conductor insulation.

SUMMARY OF THE INVENTION

To devise an impermeable connection between electric conductors having an insulation of a fluorinated ethylene polymer or between a jacketed cable having a sheath of fluorinated ethylene polymer and a housing of thermoplastic material extruded on at the plug-connector end, the present invention provides for an external coating of a thermoplastic material to be applied to the insulation of the conductors or to the sheath. This measure guarantees that the thermoplastic material of the plug-connector housing can enter into an integral connection with the likewise thermoplastic material of the coating during the extrusion process.

Since the difficulty described above is encountered, in particular, when working with conductor insulations or cable sheaths of high-temperature resistant plastics, which are subjected to a service temperature of at least about 120° C., plastics based on polybutylene terephthalate or polyamide come under consideration, in particular, for the housing of the plug connector, while the coating of the insulation or of the sheath can consist of a thermoplastic elastomer on a polyester basis or of a softly set polypropylene. Plastics of this type are commercially available.

DETAILED DESCRIPTION

Figure 1:
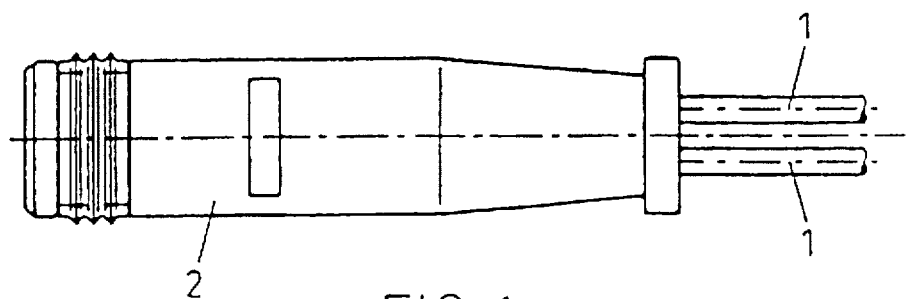
FIG. 1 depicts a side view of an exemplary embodiment of the present invention.
Figure 2:
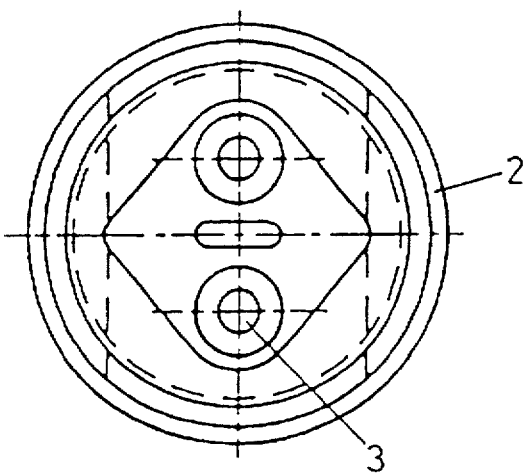
FIG. 2 depicts a front view of the exemplary embodiment of the present invention shown in FIG. 1.
Figure 3:
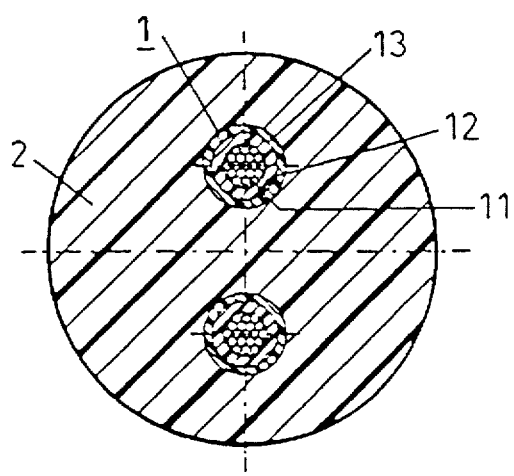
FIG. 3 depicts a cross-section of the exemplary embodiment of the present invention shown in FIGS. 1 and 2.

FIG. 1 shows a plug connector, whose housing 2 is extruded around two insulated conductors 1. As shown in FIG. 2, pin-type contact elements 3 are arranged at the ends of the insulated conductors 1. As illustrated by FIG. 3, the insulated conductors 1 are introduced with mutual clearance into the plug-connector housing 2 and directly surrounded by the material injected into the injection mold when manufacturing the plug connector. Here, a polyamide-based mixture is used as a material for the plug connector housing.

The inserted insulated conductors 1 each consist of a bunched conductor 11 having an insulation 12 of a fluorinated ethylene polymer and an external coating 13 of a thermoplastic elastomer on a polyester basis. During extrusion of the plug-connector housing, the coating 13 enters into an integral connection with the material of the plug-connector housing, so that the area of insertion of the insulated conductors 1 has an impervious design.

I claim:

1. A plug connector, comprising:
   a) at least one contact element;
   b) at least one electric conductor being attached to the at least one contact element;
   c) an insulation surrounding the at least one conductor and being made of a fluorinated ethylene polymer, said insulation having an external coating of a thermoplastic material; and
   d) a housing made of a thermoplastic material extruded around the at least one contact element and the at least one insulated electric conductor.

2. The plug connector according to claim 1, wherein the housing is made of a plastic comprising polybutylene terephthalate and the coating consists of a thermoplastic elastomer comprising polyester.

3. The plug connector according to claim 1, wherein the housing is made of a plastic comprising polyamide and the coating consists of a thermoplastic elastomer comprising polyester.

4. The plug connector according to claim 1, wherein the housing is made of a plastic comprising polybutylene terephthalate and the coating consists of a polypropylene.

5. The plug connector according to claim 1, wherein the housing is made of a plastic comprising polyamide and the coating consists of a polypropylene.

6. A multi-pin plug connector, comprising:
   a) a plurality of contact elements;
   b) a plurality of electric conductors being attached to the plurality of contact elements;
   c) a sheath jacketing the plurality of electric conductors, said sheath being made of a fluorinated ethylene polymer and having an external coating of a thermoplastic material; and d) a housing made of a thermoplastic material extruded around the plurality of contact elements, the plurality of electric conductors and the sheath.

7. The multi-pin plug connector according to claim 6, wherein the housing is made of a plastic comprising polybutylene terephthalate and the coating consists of a thermoplastic elastomer comprising polyester.

8. The multi-pin plug connector according to claim 6, wherein the housing is made of a plastic comprising polyamide and the coating consists of a thermoplastic elastomer comprising polyester.

9. The multi-pin plug connector according to claim 6, wherein the housing is made of a plastic comprising polybutylene terephthalate and the coating consists of a polypropylene.

10. The multi-pin plug connector according to claim 6, wherein the housing is made of a plastic comprising polyamide and the coating consists of a polypropylene.

11. A single-pin plug connector, comprising:
 a) a contact element;
 b) an electric conductor being attached to the contact element;
 c) an insulation surrounding the electric conductor and being made of a fluorinated ethylene polymer, said insulation having an external coating of a thermoplastic material; and
 d) a housing made of a thermoplastic material extruded around the contact element, the electric conductor and the insulation.

12. The multi-pin plug connector according to claim 11, wherein the housing is made of a plastic comprising polybutylene terephthalate and the coating consists of a thermoplastic elastomer comprising polyester.

13. The multi-pin plug connector according to claim 11, wherein the housing is made of a plastic comprising polyamide and the coating consists of a thermoplastic elastomer comprising polyester.

14. The multi-pin plug connector according to claim 11, wherein the housing is made of a plastic comprising polybutylene terephthalate and the coating consists of a polypropylene.

15. The multi-pin plug connector according to claim 11, wherein the housing is made of a plastic comprising polyamide and the coating consists of a polypropylene.

* * * * *